June 8, 1971    J. PIEN    3,583,968
PROCESS FOR EXTRACTING PROTEINS FROM WHEY
Filed June 26, 1967
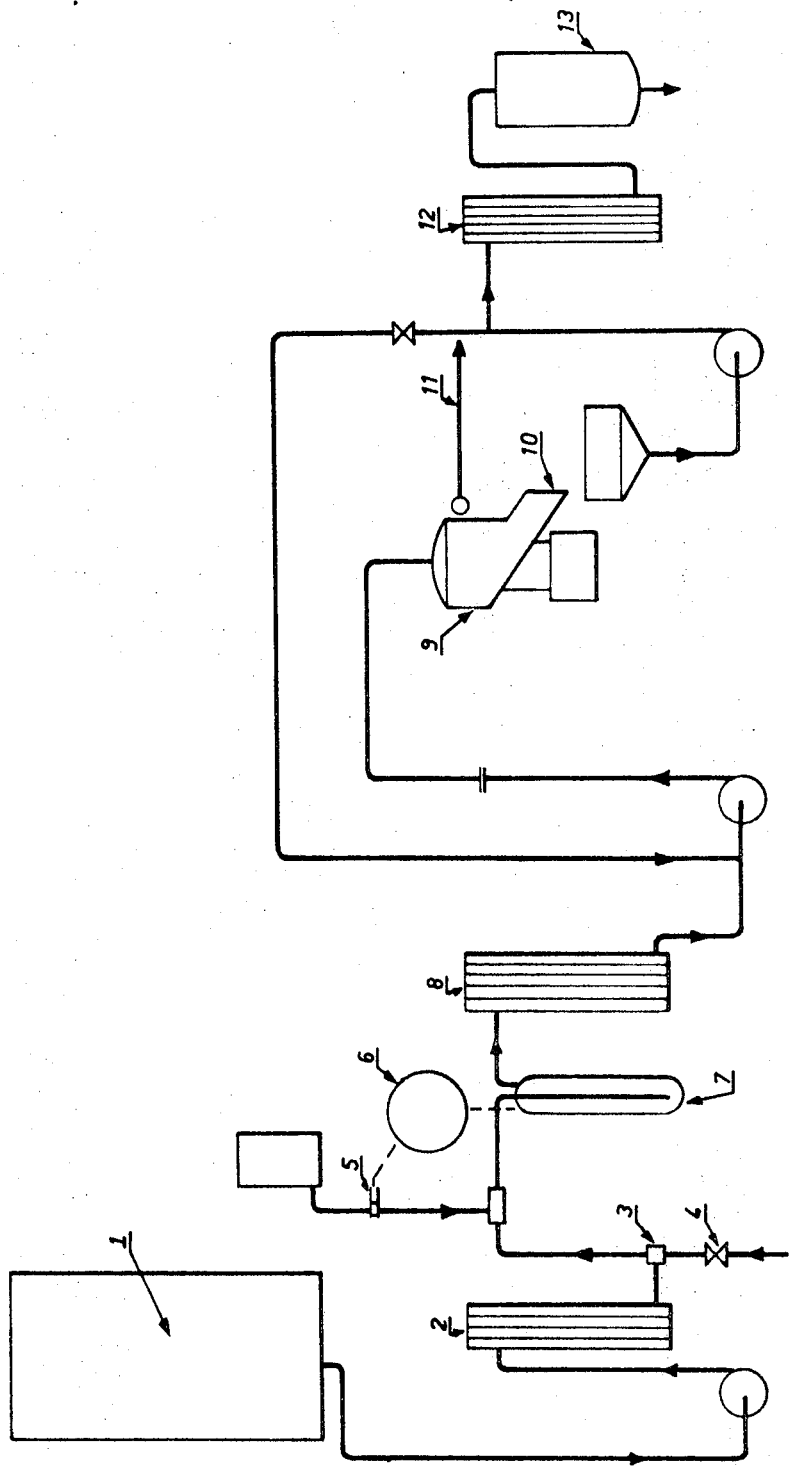
INVENTOR
JEAN PIEN
By [signature] Atty

United States Patent Office 3,583,968
Patented June 8, 1971

3,583,968
PROCESS FOR EXTRACTING PROTEINS FROM WHEY
Jean Pien, 44 Rue Louis Blanc, Paris 75, France
Filed June 26, 1967, Ser. No. 648,828
Claims priority, application France, June 27, 1966, 67,073
Int. Cl. A23j 1/20
U.S. Cl. 260—112                                    2 Claims

ABSTRACT OF THE DISCLOSURE

A continuous and automatic process for extracting proteins from whey which are of excellent physical, chemical and batcteriological quality and which are perfectly well suited to all purposes, wherein the whey is acidified to a pH of the order of 4.7, heated to a temperature within the range of 90° C. to 100° C. and subjected to a dynamic heat treatment for a period which can vary between 10 and 30 minutes.

---

This invention relates to improvements in the process for extracting proteins from whey.

The whey which separates from the coagulum or curd formed under the action of rennet extract on milk during the manufacture of cheese contains a certain number of substances in solution. Among these can be mentioned protein substances which cannot be coagulated by rennet. Such substances are mainly represented by lactalbumin and lactoglobulin, the total quantity of which amounts to approximately 5 to 6 grams per liter of whey. This quantity varies according to the milk, the seasons, the variety of cheese manufactured, and so forth.

These particular proteins have a large number of potential uses of a varied nature such as, for example, food for human consumption or animal feed, pharmaceutical and dietary products, the manufacture of certain varities of the so-called "whey" cheese. Said proteins can also be incorporated with the milk employed in the manufacture of cheese for the purpose of increasing the yield. The application last referred-to makes it possible to increase the yield factor of cheese-factory milk to a substantial extent which can vary between 12 and 18%, as has been disclosed in the co-pending application filed by the present applicant on Jan. 17, 1966 under No. 520,890.

In some of the applications mentioned above, and especially when it is desired to incorporate whey proteins in cheese-factory milk, it is not possible to employ the well-known and conventional techniques already employed in the extraction of proteins for other less noble purposes.

The conventional techniques referred-to generally consist in heating the whey which has previously been acidified to a greater or lesser extent and in bringing it to the vicinity of its boiling point, in maintaining the hot whey at this temperature for a period of time which is sufficient to harden the proteins and facilitate the extraction of these latter, and finally in separating-out the insoluble element by decantation or filtration.

These techniques are attended by a number of disadvantages: they do not lend themselves to continuous industrial production and the products thus obtained do not have the requisite properties for the majority of the nutritional uses referred-to in the foregoing. In particular, the products are not well suited to reincorporation in the milk employed for the manufacture of cheese.

This invention is directed to a process and a device for extracting proteins from whey which are of excellent physical, chemical and bacteriological quality and which are perfectly well suited to all purposes, said process and device being intended for continuous and practically automatic operation.

The correct insolubilization of the albumin and of the globulin makes it necessary to maintain the whey in an acid medium over an extended period of time and at a temperature within the range of 90° C. to 100° C. In a continuous manufacturing process, this heat treatment cannot be static and must be dynamic. However, if the agitation or stirring action which results from the dynamic heat treatment referred-to is too violent, the protein precipitates to form particles which are either too small or too light to be separated effectively.

In accordance with the invention, the dynamic heat treatment which entails very moderate agitation can be carried out first by acidifying the whey, for example to a pH of 4.7, then by heating it to the requisite temperature (for example 95° C.) in a duct having a suitable length and diameter and consisting of straight tubes joined to each other by bends or alternatively of helical tubes which form one or a number of coils. These tubes are fabricated from stainless alloys or plastic materials which afford resistance to a temperature of 100° C. without sustaining deformation.

It would also come within the scope of this invention to group the above-mentioned tubes within a vessel through which either water or any other liquid is circulated at a suitable temperature or to surround said tubes with an insulating layer for the purpose of preventing the whey from being cooled before the proper time while flowing within said ducts.

Another essential feature of the invention consists in cooling the whey to approximately 30° C.–40° C. then in extracting the proteins which are thus rendered insoluble in the whey by resorting to the use of a suitable centrifugal extractor which permits the continuous separation, on the one hand of a "protein milk" consisting of a concentrated suspension of fine insolubilized micelles of the protein in the whey and, on the other hand, of the deproteinized whey.

The protein milk thus obtained can contain a total dry extract which s comprised between 12 and 20% and preferably in the vicinity of 16%. This last-mentioned value corresponds to a proportion of approximately 10% of proteins which are assumed to be of high purity and in the dry state.

The physical structure of the said protein milk is extremely fine, unctuous and homogeneous. This quality cannot be obtained by means of any conventional extraction processes at present known, and the method adopted for achieving this result is an essential feature of the present invention. In point of fact, the particular structure referred-to is essential to the success of the majority of applications of whey proteins, whether for the purpose of spray-drying and preparation of pharmacetutical and dietary products or for the purpose of incorporation with the milk employed in cheese manufacture in order to improve the yield, and so forth.

By way of non-limitative example, one application of the foregoing principles which has been carried into practical effect will now be described in reference to the accompanying drawings.

The whey which is derived from a production batch of soft cheese is collected very carefully and progressively as it is produced, cooled to +8° C. and stored until the following day in a stainless steel vat 1 having a capacity of 30,000 liters.

On the following day, the whey is subjected to the following series of treatment operations:

(1) Reheating to 65° C. in a plate-type heat exchanger 2 at a flow rate of 5,000 l./hr.

(2) Second heating from 65° C. to 95° C. by direct vapor injection 3 controlled by a regulating valve 4.

(3) Continuous acidification to a pH of 4.7 by injection of hydrochloric acid by means of a small proportioning pump 5, the quantities injected being controlled by an apparatus for regulating the pH as designated by the reference numeral 6.

(4) Heat treatment of the whey at 95° C. and at a pH of 4.7 within a plastic duct 7 of suitable length for a minimum period of 15 minutes. During this heating process, the precipitation of the proteins is practically complete.

(5) Cooling of the whey containing the insolubilized protein in a plate-type exchanger 8 to a temperature of 35° C. approximately in continuous operation.

(6) Centrifugal extraction in a continuous separator 9. The mixture consisting of whey+proteins is admitted into the apparatus at a rate of 5,000 liters per hour and restores in continuous operation on the one hand a "protein milk" at 10 and, on the other hand, the deproteinized whey at 11.

(7) If the use of the "protein milk" has to be deferred, said milk must accordingly be cooled to a low temperature at 12 prior to storage at 13 or transportation.

(8) The deproteinized whey may be employed, after concentration if necessary, for the manufacture of feed for livestock, for the extraction of lactose, for drying and so forth.

The field of application of this invention is not limited to the example provided in the foregoing. It accordingly follows that the utilization of whey which has been previously concentrated, the regulation of the pH to any value other than 4.7, centrifugal extraction at temperatures other than 35° or any other modifications in the application of principles also come within the scope of the invention.

What I claim is:

1. A method of continuously extracting from whey a suspension of proteins, which method comprises: continuously acidifying the whey at pH 4.7 while maintaining the whey at a temperature of from 90° C. to 100° C., causing the precipitation of the proteins together with very moderate agitation of the whey by flowing the heated and acidified whey for a period of time between 10 minutes and 30 minutes in an externally heated tubular duct while maintaining the whey at said temperature, cooling the thus treated whey containing the precipitated proteins to a temperature of 30° C. to 40° C. and then centrifugating the whey to separate therefrom a suspension of proteins.

2. A method as claimed in claim 1 and wherein the whey already is heated to said temperature before being acidified to said pH.

References Cited

UNITED STATES PATENTS

| | | | |
|---|---|---|---|
| 2,606,181 | 8/1952 | Pratt et al. | 260—122 |
| 2,908,575 | 3/1956 | Spiess et al. | 99—116 |
| 3,252,961 | 5/1966 | Rodgers et al. | 260—112 |

A. LOUIS MONACELL, Primary Examiner

R. B. ANDEWELT, Assistant Examiner

U.S. Cl. X.R.

99—19, 57, 116; 260—122